(12) United States Patent
Poirier

(10) Patent No.: US 8,970,129 B2
(45) Date of Patent: Mar. 3, 2015

(54) VOLTAGE CONVERSION CIRCUIT AND VOLTAGE CONVERSION METHOD

(75) Inventor: Sébastien Poirier, Valencia (ES)

(73) Assignee: AMS AG, Unterpremstaetten (AT)

( * ) Notice: Subject to any disclaimer, the term of this patent is extended or adjusted under 35 U.S.C. 154(b) by 1061 days.

(21) Appl. No.: 13/002,902

(22) PCT Filed: Jun. 24, 2009

(86) PCT No.: PCT/EP2009/057923
§ 371 (c)(1),
(2), (4) Date: May 18, 2011

(87) PCT Pub. No.: WO2010/003822
PCT Pub. Date: Jan. 14, 2010

(65) Prior Publication Data
US 2011/0215737 A1 Sep. 8, 2011

(30) Foreign Application Priority Data
Jul. 8, 2008 (EP) .................................... 08012336

(51) Int. Cl.
| H05B 37/02 | (2006.01) |
| H02M 3/156 | (2006.01) |
| H05B 33/08 | (2006.01) |

(52) U.S. Cl.
CPC ........... *H02M 3/156* (2013.01); *H05B 33/0818* (2013.01); *Y02B 20/346* (2013.01)
USPC ............ 315/297; 315/294; 315/291; 323/234

(58) Field of Classification Search
USPC .............. 315/291, 294, 297, 307, 312, 209 R
See application file for complete search history.

(56) References Cited

U.S. PATENT DOCUMENTS

| 6,909,249 | B2 | 6/2005 | Otake | |
| 2004/0119451 | A1* | 6/2004 | Otake | ............................ 323/274 |
| 2004/0124889 | A1 | 7/2004 | Koharagi | |

FOREIGN PATENT DOCUMENTS

| DE | 10 2006 024 422 | 11/2007 |
| DE | 10 2006 032 071 | 1/2008 |
| JP | 2004-194448 | 7/2004 |
| WO | WO 2007/134871 | 11/2007 |
| WO | WO2007134871 | * 11/2007 |

* cited by examiner

*Primary Examiner* — Tung X Le
*Assistant Examiner* — Jonathan Cooper
(74) *Attorney, Agent, or Firm* — McDermott Will & Emery LLP

(57) ABSTRACT

A voltage conversion circuit comprises a first and a second output (O1, O2) which are configured to have an electric load (LD) connected therebetween, wherein an output signal between the first and a second output (O1, O2) is generated in response to a pulse-width modulated clock signal (PWM). The circuit further comprises a forward branch (FWD) being configured to generate an output voltage (VDC) at the first output (O1) depending on a control signal. A feedback branch (FBK) comprises a comparison circuit (CC) being configured to generate the control signal. The feedback branch (FBK) is configured to provide a first potential corresponding to a voltage (VSINK) at a second output (O2) to a comparison input (CI) of the comparison circuit (CC) during a first sensing period which corresponds to at least a part of a period of a first state of the clock signal (PWM) and to provide a second potential derived from the voltage (VSINK) at a second output (O2) by means of a first charge store (C1) to the comparison input (CI) during a second sensing period which corresponds to a part of a period of a second state of the clock signal (PWM).

15 Claims, 2 Drawing Sheets

VOLTAGE CONVERSION CIRCUIT AND VOLTAGE CONVERSION METHOD

RELATED APPLICATIONS

This is a U.S. national stage of application No. PCT/EP2009/057923, filed on Jun. 24, 2009.

This application claims the priority of European application no. 08012336.7 filed Jul. 8, 2008, the entire content of which is hereby incorporated by reference.

FIELD OF THE INVENTION

The invention relates to a voltage conversion circuit and a voltage conversion method which can be used to supply an electric load with an output signal in response to a pulse-width modulated clock signal. The invention further relates to a use of such a voltage conversion circuit.

BACKGROUND OF THE INVENTION

Voltage conversion circuits can be used to supply energy to electric loads. For example, in an illumination application light emitting diodes (LEDs) are supplied by such circuits. To this end a controlled voltage is provided to a first connection of a LED or a string of LEDs in a pulsed fashion. This can for example be done by switching a current through the LEDs on and off depending on a pulse-width modulated signal. For controlling the voltage at the first connection of the voltage conversion circuit, a voltage at a second connection of the LEDs can be compared to a reference voltage during a current flowing through the LEDs. If the current is switched off, the voltage at the second connection changes towards the controlled voltage at the first connection. As a consequence, a comparison is not possible in the switched-off state. As therefore only a limited time for controlling the voltage at the first connection is available, controlling may become inaccurate.

SUMMARY OF THE INVENTION

It is an object of the invention to provide a voltage conversion circuit and a voltage conversion method which make a more accurate controlling of an output voltage possible in a switched-off state of an electric load to be supplied. It is also an object of the invention to provide a use for the voltage conversion circuit.

A voltage conversion circuit according to one embodiment comprises a first and a second output which are configured to have an electric load connected in between. The voltage conversion circuit is configured to generate an output signal between the first and the second output in response to a pulse-width modulated clock signal. It further comprises a forward branch which is configured to generate an output voltage at the first output depending on a control signal. A feedback branch comprises a first charge store with a first end coupled to the second output and comprises a comparison circuit which is configured to generate the control signal. To this end the feedback branch is configured to provide a first potential corresponding to a voltage at the second output to a comparison input of the comparison circuit during a first sensing period. A second potential derived from the voltage at the second output by means of the first charge store is provided to the comparison input during a second sensing period. The first sensing period corresponds to at least a part of a period of a first state of the pulse-width modulated clock signal while the second sensing period corresponds to a part of a period of a second state of the pulse-width modulated clock signal. The control signal is generated by evaluating the first and the second potential respectively.

The first state of the pulse-width modulated clock signal can effect a current flow through the electric load in operation of the voltage conversion circuit such that a voltage at the second output results depending on the output voltage at the first output and a voltage drop across the electric load. This voltage at the second output can be directly used as the first potential during the first sensing period. The second state of the pulse-width modulated clock signal effects that there is less or no current flow through the electric load, such that a higher voltage results at the second output being equal or near to the output voltage. By means of the first charge store the higher voltage at the second output is shifted to a lower voltage which results in the second potential. In other words, the first and the second potential can have basically the same value. If the output voltage varies during the second sensing period, the second potential varies accordingly in response to the voltage shifting of the first charge store.

Accordingly, it is possible to sense variations of the output voltage not only during a switched-on state of the electric load but also during a switched-off state of the load such that controlling of the output voltage can be performed more smoothly and with a higher accuracy. Furthermore, switching noise resulting from the voltage control can be reduced.

The first sensing period can be the whole time period in which the pulse-width modulated clock signal has the first state. It is also possible that the first sensing period is only a part of the time period of the first state. When switching from the first state to the second state of the pulse-width modulated clock signal, the voltage at the second output changes, as mentioned above. This voltage change can be applied to the first charge store such that a charge and a corresponding voltage of the first charge store basically equals to the voltage change at the second output between first and second state.

After charging of the first charge store the stored voltage can be used to derive the second potential from the changed voltage at the second output. Accordingly, the second sensing period corresponds to a part of the time period in which the pulse-width modulated clock signal has the second state. For example the second sensing period starts shortly after switching from the first to the second state and ends when switching back to the first state.

In one embodiment the feedback branch is configured to connect the comparison input to the second output directly during the first sensing period and via the first charge store during the second sensing period. Accordingly, basically the same or, in other words a continuous voltage or potential can be evaluated by the comparison circuit during both the first and the second sensing period.

The comparison circuit is for example configured to generate the control signal depending on a respective comparison of the first and second potential with a reference voltage. In other words, the first potential is compared to the reference voltage during the first sensing period and the second potential is compared to the same reference voltage during the second sensing period. Therefore a respective potential can be evaluated by the comparisons circuit basically in a continuous fashion, thus improving the accuracy of the voltage control.

In a further embodiment the feedback branch comprises a first switch coupling the second output to the comparison input. Furthermore a second end of the first charge store is coupled to the comparison input via a second switch. By a respective controlling of the first and the second switch the first and the second potential can be derived. Preferably the first switch couples the second output to the comparison input directly. Furthermore it is preferable that the first end of the first charge store is connected to the second output directly and the second end is coupled to the comparison input solely by the second switch.

In a further embodiment the feedback branch comprises a buffer stage with an input coupled to the comparison input and an output coupled to the second end of the first charge store via a third switch. Accordingly, in a closed state of the third switch the respective potential at the comparison input is provided to the second end of the first charge store in a buffered fashion. This makes it possible to pre-charge the first charge store with the first potential during the first sensing period such that when the state of the pulse-width modulated clock signal changes, the resulting voltage change can be stored on the first charge store.

In a further embodiment the feedback branch comprises a second charge store coupled between the comparison input and a ground potential terminal. The potential at the comparison input can therefore be stored on the second charge store such that the stored potential can be evaluated by the comparison circuit during time periods in which no other potential is provided to the comparison input. The stored potential on the second charge store can also be used for pre-charging the first charge store via the buffer stage.

The feedback branch according to this embodiment therefore comprises two charge stores, the first one for following the voltage at the second output during the second sensing period and the second one for basically maintaining a stable or constant voltage level at the comparison input. Hence, such a circuit generally comprises a two-storage system in its feedback path, regardless of the implementation how the first and the second charge store are connected.

Respective control signals for the first, the second and the third switch are preferably derived from the pulse-width modulated clock signal.

In a further embodiment the voltage conversion circuit comprises a current source coupled to the second output, wherein the current source is controllable by the pulse-width modulated clock signal. For example the current source is configured to provide a first current for the first state of the pulse-width modulated clock signal and to provide a second current for the second state of the pulse-width modulated clock signal. For example the first current is a current for active driving of the electric load while the second current is a current for a switched-off mode of the electric load. The second current can be a zero current but preferably is a small non-zero current. In other words, the first and the second current are preferably distinct from zero.

The control signal for generating the output voltage at the first output can be generated basically continuously with the embodiments described above. However, as the electric load needs less energy in the switched-off state corresponding basically to the second state of the pulse-width modulated clock signal, active controlling of the output voltage may not be needed during the whole period of the second state. To this end in one embodiment the forward branch is configured to generate the output voltage further depending on a clocked activation signal and on the state of the pulse-width modulated clock signal. For example, if the pulse-width modulated clock signal has the second state, the control signal may be used for controlling the output voltage only if the activation signal has an active or high state.

In an embodiment of a voltage conversion method an electric load is provided which is connected between a first and a second output. Furthermore, a charge store with a first end coupled to the second output is provided. Depending on a control signal an output voltage is generated at the first output. Furthermore an output signal between the first and a second output is generated in response to a pulse-width modulated clock signal. During a first sensing period which corresponds to at least a part of a period of a first state of the pulse-width modulated clock signal a first potential corresponding to a voltage at the second output is compared with a reference voltage. During a second sensing period which corresponds to a part of a period of a second state of pulse-width modulated clock signal a second potential derived from the voltage at the second output by means of the charge store is compared with the same reference voltage. The control signal is generated depending on the comparison results of the first and a second potential.

With this method it is possible to generate a control signal for controlling an output voltage basically continuously although a voltage at the second output changes in response to the pulse-width modulated clock signal. Therefore the accuracy of the voltage controlling can be improved.

In one embodiment the charge store is pre-charged during an intermediate period between the first and a second sensing period. For example the voltage change at the second output after changing from the first state of the pulse-width modulated clock signal to the second state can be stored on the charge store through the pre-charging in the intermediate period.

Furthermore the charge store can also be pre-charged during the first sensing period depending on the first potential. In other words, the pre-charging of the charge store can be performed during the first sensing period and during the intermediate period which preferably follows immediately to the first sensing period.

In one embodiment of the method generating the output signal comprises providing a first current for the first state of the pulse-width modulated clock signal and providing a second current for the second state of pulse-width modulated clock signal. The first current is a driving current for the electric load while the second current is a current in a switched-off state of the electric load. Preferably both, the first and the second current are distinct from zero.

The embodiments of the voltage conversion circuit and the voltage conversion method can be used for example in illumination arrangements, wherein the electric load is provided with a light emitting element. Because of the more continuous controlling of the output voltage, less switching can be needed in the controlling process which results in reduced switching noise of the voltage conversion circuit and an illumination arrangement using the circuit. The illumination arrangement may for example be a display of a mobile phone or another device which is sensitive to switching noise. The light emitting elements can be conventional LEDs of any color or organic LEDs. The described embodiments can for example also be used in illumination arrangements with an external input for the pulse-width modulated clock signal where dynamic luminance scaling is used.

BRIEF DESCRIPTION OF THE DRAWINGS

The text below explains the invention in detail using exemplary embodiments with reference to the drawings, in which.

DETAILED DESCRIPTION OF THE DRAWINGS

Figure 1:
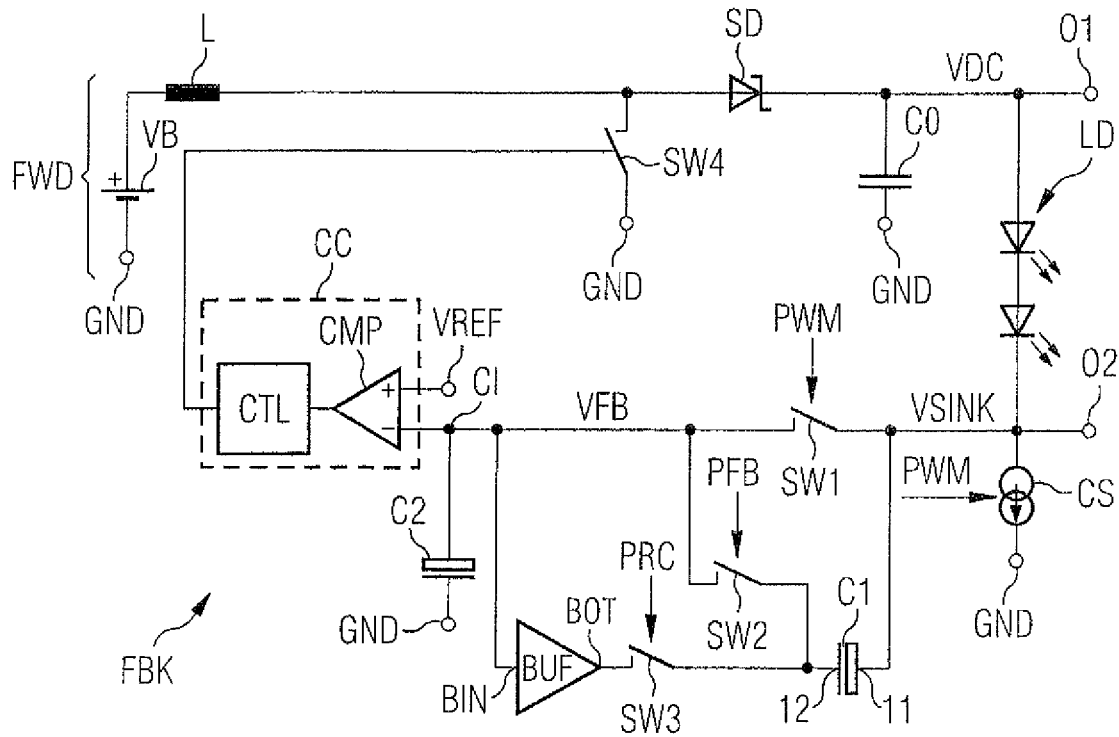
FIG. 1 is a first embodiment of a voltage conversion circuit.

FIG. 1 shows an embodiment of a voltage conversion circuit comprising a forward branch FWD, a feedback branch FBK, a first and a second output O1, O2 and a current source CS which is coupled between the second output O2 and a ground potential terminal GND. An electric load LD is connected between the first and the second output O1, O2 which is exemplarily shown as two LEDs. The forward branch FWD comprises an inductive element L coupled to a voltage source VB. The inductive element L is further coupled to the first output O1 via a Schottky-diode SD. A charge store C0 is coupled between the first output O1 and the ground potential terminal GND. A switch SW4 couples a connection of the inductive element L and the Schottky-diode SD to the ground potential terminal and is controllable by a control signal provided via comparison circuit CC.

The feedback branch FBK comprises the comparison circuit CC and a coupling of a comparison input CI of the comparison circuit CC to the second output O2. To this end a first switch SW1 couples the second output O2 basically directly to the comparison input CI. Furthermore a first charge store C1 is provided with a first end 11, coupled to the second output O2, and a second end 12. A second switch SW2 connects the comparison input CI to the second end 12. Furthermore a buffer stage BUF is included in the feedback branch FBK having an input BIN coupled to the comparison input CI and an output BOT coupled to the second end 12 of the first charge store C1 by a third switch SW3. A second charge store C2 couples the comparison input CI to the ground potential terminal GND. The comparison circuit CC comprises a comparison element CMP with an inverting input − coupled to the comparison input CI and a non-inverting input + coupled to a reference voltage terminal VREF. An output of the comparison element CMP is coupled to a control unit CTL whose output is coupled to the switch SW4 of the forward branch FWD for providing the respective control signal.

During operation of the voltage conversion circuit an output voltage VDC is generated at the first output O1 by means of the forward branch FWD. When the switch SW4 is closed, the inductive element L is charged with electric energy by the voltage source VB. When opening the switch SW4, the electric energy stored in the inductive element L is provided to the first output O1 via the Schottky-diode SD and to the charge store C0. Therefore, by respective switching of the switch SW4, the output voltage VDC results, wherein the value of the output voltage VDC depends on the control signal provided to the switch SW4. In alternative embodiments the Schottky-diode SD can also be replaced by a conventional diode or a transistor which may be controlled depending on the control signal or a signal derived from the control signal.

The current source CS is controlled by the pulse-width modulated clock signal PWM such that it effects a current flow of a first current through the electric load LD in a first state of the pulse-width modulated clock signal PWM and no or a small current flow in a second state of the pulse-width modulated clock signal PWM. Accordingly, in the first state a voltage drop results across the electric load LD effecting a low voltage value of a voltage VSINK at the second output O2. In the second state of the pulse-width modulated clock signal PWM the voltage drop across the electric load LD is reduced because of the reduced current through the load LD such that the voltage VSINK changes to a higher value. In the first state of PWM the first switch SW1 is closed such that the voltage VSINK is provided as a first potential to the comparison input CI, effecting a feedback voltage VFB at the comparison input CI. Furthermore the second charge store C2 is charged to the value of the feedback voltage VFB. The second switch SW2 is open in the first state of the pulse-width modulated clock signal PWM in response to the respective control signal PFB. Furthermore, by means of the buffer stage BUF and the third switch SW3, which is closed, the first charge store C1 can be pre-charged to a voltage corresponding to a voltage change between the first and the second state of pulse-width modulated clock signal. The pre-charging is performed in response to a pre-charge signal PRC controlling the switch SW3. The function of the feedback branch FBK will be described in more detail with respect to FIG. 3.

Figure 2:
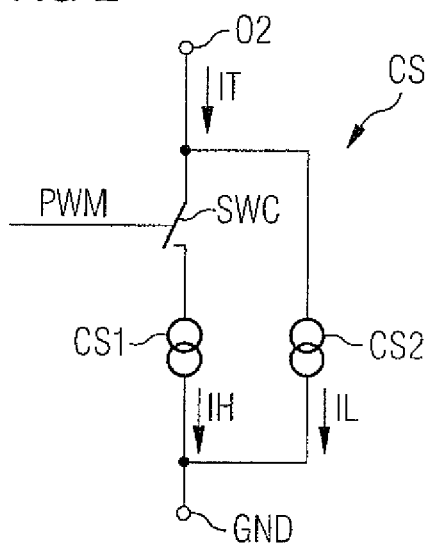
FIG. 2 is an embodiment of a controllable current source.

FIG. 2 shows an embodiment of a current source CS comprising a first and a second current source CS1, CS2. The second current source CS2 is connected permanently between the second output O2 and the ground potential terminal GND for providing a preferably small current IL. The first current source CS1 is connected in parallel to the second current source CS2 in series with a control switch SWC which is controlled by the pulse-width modulated clock signal PWM. Therefore in an open state of the control switch SWC a total output current IT of the current source CS equals the low current IL of the second current source CS2, while in the closed state of the control switch SWC the total current IT corresponds to the sum of the lower current IL and a higher current IH of the first current source CS1.

In alternative embodiments of the current source CS it is also possible to switch between two current sources such that a total current results from either the current from the first current source or the current from the second current source.

Figure 3:
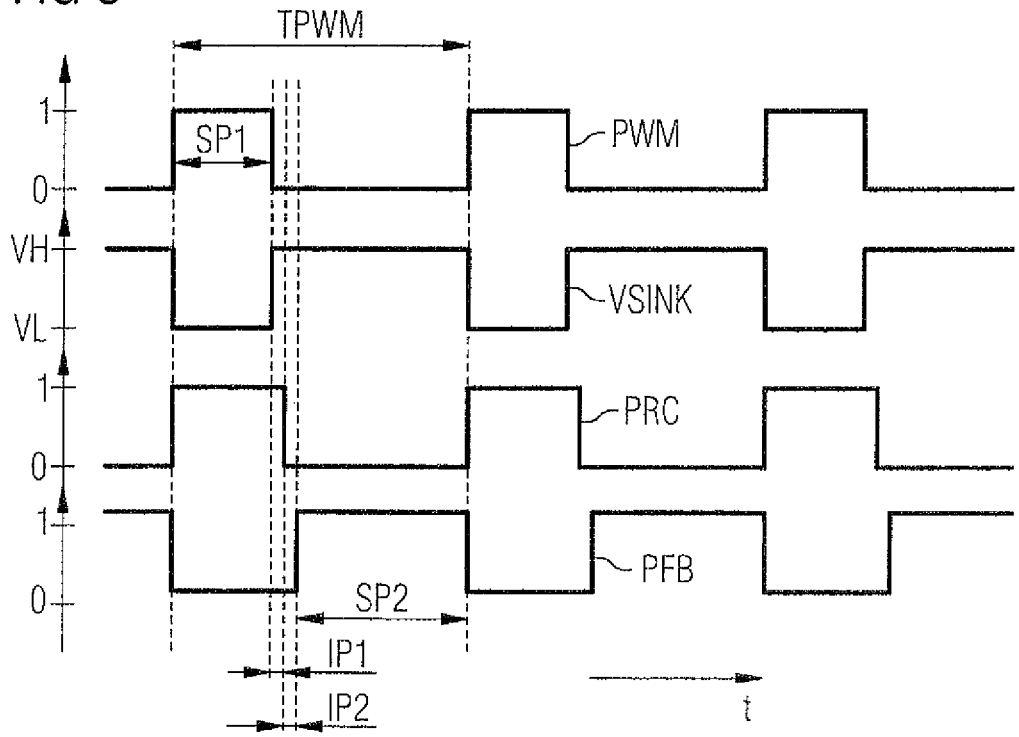
FIG. 3 is a signal diagram of signals used in the voltage conversion circuit.

FIG. 3 shows an exemplary signal diagram of signals used in the embodiments of the voltage conversion circuit of FIG. 1. The first signal shown is the pulse-width modulated clock signal PWM having a first state 1 and a second state 0. A clock period length of the clock signal PWM is shown as TPWM between two rising clock edges. As described before for FIG. 1, it can be seen that the second signal, namely the voltage VSINK at the second output O2 changes with the state of the clock signal PWM. For example, in the first state of the clock signal PWM the voltage VSINK has a low value VL while in the second state the voltage VSINK changes to a high value VH.

With reference to FIG. 1, during the first state 1 of the clock signal PWM the first switch SW1 is closed such that the low value VL of the voltage VSINK determines a first potential resulting in a feedback voltage VFB at the comparison input CI. As can be seen from FIG. 3, during this first sensing period SP1 corresponding to the first state of the clock signal PWM the pre-charge signal PRC has a high value resulting in a closed third switch SW3. Therefore the second end 12 of the first charge store C1 is charged with the feedback voltage VFB or the low value VL respectively. The second switch SW2 is open during the first sensing period SP1 in response to the control signal PFB.

When the state of the clock signal PWM changes to the second state 0, the first switch SW1 is opened. During a first intermediate period IP1 following the first sensing period SP1 the third switch SW3 stays closed in response to the still high pre-charge signal PRC. The feedback voltage VFB stays basically constant because of the charged second charge store C2. Therefore during the first intermediate period IP1 the feedback voltage VFB can still be provided to the second end 12 of the first charge store C1. Because of the buffer stage BUF, the potential at the second charge store C2 can remain basically unchanged while charging the first charge store C1 at the second end 12. Additionally, during the first intermediate period IP1, the higher value VH of the voltage VSINK is provided to the first end 11 of the first charge store C1 such that the voltage change between the low value VL and the high value VH is stored on the first charge store C1 during the first intermediate period IP1 dynamically. It should be noted that the voltage VSINK is drawn ideally in FIG. 3 such that in a real circuit the rising of the voltage VSINK from the low value VL to the high value VH may take a certain time. Accordingly, the first intermediate period IP1 should be chosen such that the high value VH can be achieved by the voltage VSINK.

When pre-charging of the first charge store C1 is finished at the end of the first intermediate period IP1, the third switch SW3 is opened in response to the pre-charge signal PRC. After a second intermediate period IP2 the control signal PFB becomes high such that the second switch SW2 is closed and the second end 12 of the first charge store is electrically connected to the comparison input CI. As the charge store C1 is pre-charged, a second potential is derived from the voltage VSINK via the first charge store C1 being basically unchanged with respect to the feedback voltage VFB until the end of the second intermediate period IP2. In other words, the feedback voltage VFB is sensed during a second sensing period SP2 beginning after the end of the second intermediate period IP2 and ending when the clock signal PWM changes to the first state.

As can be seen from the description before, the feedback voltage VFB stays basically constant during both the first and the second state of the clack signal PWM or, in other words, stays basically constant continuously. The feedback voltage VFB is compared to a reference voltage provided at the reference input VREF by the comparison circuit CC. Deriving of the control signal at the output of the control unit CTL depending on the comparison of the feedback voltage VFB to the reference voltage is well-known such that a detailed description is omitted here.

Because of the fixed current determined by the current source CS through the load LD, a respective voltage drop being basically constant results across the load LD. Therefore variations of the output voltage VDC directly influence a value of the voltage VSINK at the second output O2. Controlling of the output voltage VDC is performed such that the resulting voltage VSINK at a second output O2 equals the reference voltage at the reference input VREF. Accordingly, with the embodiment shown in FIG. 1 it is possible to sense changes of the output voltage VDC not only during the first sensing period SP1, where the voltage VSINK is evaluated directly, but also during the second sensing period SP2, as any changes occurring to the voltage VSINK influence the value of the feedback voltage VFB.

Figure 4:
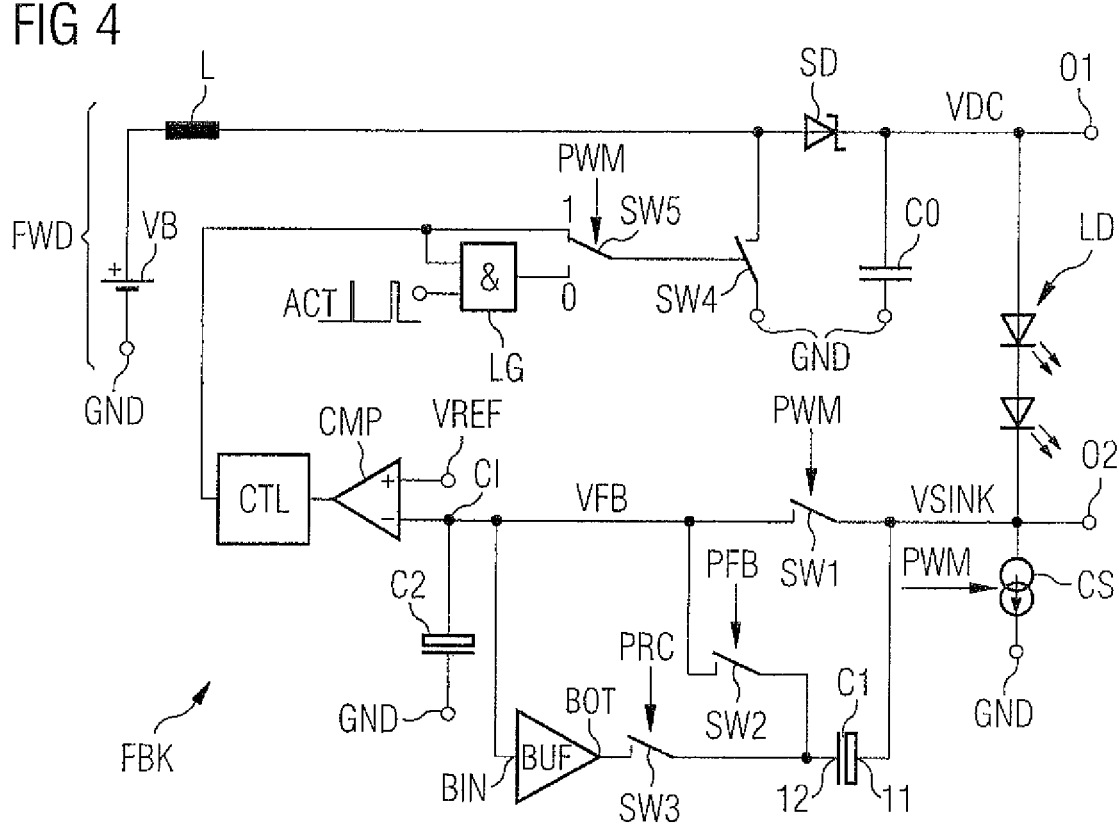
FIG. 4 is second embodiment of a voltage conversion circuit.

FIG. 4 shows another embodiment of a voltage conversion circuit which basically is a development of the circuit shown in FIG. 1. Accordingly, elements and function described for FIG. 1 will not be described again for FIG. 4.

Additionally to the elements shown in FIG. 1, the forward branch FWD comprises a further switch SW5 having two positions 0, 1, wherein position 1 is connected, for example directly, to the output of the control unit CTL for receiving the control signal which is generated as described for FIG. 1. The position 0 is coupled to an output of a logical AND gate LG of which one input is coupled to the output of the control unit CTL and the other input is provided with an activation signal ACT. The activation signal ACT is a clock signal which for example has a clock period corresponding to the clock period TPWM of the pulse-width modulated clock signal PWM.

During the first state of the clock signal PWM electric energy stored for example in the inductive element L and the charge store C0 is used by the electric load LD. Accordingly, during this time it can be useful to perform controlling of the output VDC continuously by providing the control signal directly and continuously to the switch SW4. During the second state of the clock signal PWM the electric load LD needs less energy such that continuous controlling of the output voltage VDC, corresponding to storing energy in the inductive element L and the charge store C0, may not be needed. To this end in the second state of the clock signal PWM the switch SW4 is controlled by the output signal of the logical AND gate LG. In other words, the control signal is only provided to the switch SW4 during a high state of the clocked activation signal ACT. For example, a time of the high state of the activation signal ACT corresponds to a predetermined percentage of the time of the second state of the clock signal PWM, for example 10%. Accordingly, switching is reduced for the switch SW4, thus further reducing possible switching noise.

With the embodiments described above it is possible to perform controlling of an output voltage by sensing voltage variations at a single point of the voltage conversion circuit in a continuous fashion. Therefore the voltage conversion circuit can perform the controlling of the output voltage with a higher accuracy. Furthermore, as a voltage used for controlling is sensed at a single connection, such a circuit can be built with less effort.

The scope of protection of the invention is not limited to the examples given hereinabove. The invention is embodied in each novel characteristic and each combination of characteristics, which includes every combination of any features which are stated in the claims, even if this feature or combination of features is not explicitly stated in the examples.

The invention claimed is:

1. A voltage conversion circuit comprising a first output and a second output which are configured to have an electric load connected there between, the voltage conversion circuit being configured to generate an output signal between the first output and the second output in response to a pulse-width modulated clock signal, and further comprising:
   a forward branch configured to generate an output voltage at the first output depending on a control signal; and
   a feedback branch comprising a comparison circuit to generate the control signal, comprising a first switch coupling the second output to a comparison input of the comparison circuit, and comprising a first charge store with a first end directly connected to the second output and with a second end coupled to the comparison input via a second switch, the feedback branch being configured to provide a first potential corresponding to a voltage at the second output to the comparison input by switchably coupling, via the first switch, the second output to the comparison input during a first sensing period which corresponds to at least a part of a period of a first state of the pulse-width modulated clock signal, and to provide a second potential derived from the voltage at the second output by the first charge store to the comparison input by switchably coupling, via the second switch, the second end of the first charge store to the comparison input during a second sensing period which corresponds to a part of a period of a second state of the pulse-width modulated clock signal.

2. The voltage conversion circuit according to claim 1, wherein the feedback branch is configured to connect the comparison input to the second output directly during the first sensing period and via the first charge store during the second sensing period.

3. The voltage conversion circuit according to claim 1, wherein the comparison circuit is configured to generate the control signal depending on a respective comparison of the first and second potential with a reference voltage.

4. The voltage conversion circuit according to claim 1, wherein the feedback branch comprises a first switch coupling the second output to the comparison input and further comprises the first charge store with a second end coupled to the comparison input via a second switch.

5. The voltage conversion circuit according to claim 4, wherein the feedback branch comprises a buffer stage with an input coupled to the comparison input and an output coupled to the second end of the first charge store via a third switch.

6. The voltage conversion circuit according to claim 1, wherein the feedback branch comprises a second charge store coupled between the comparison input and a ground potential terminal.

7. The voltage conversion circuit according to claim 1, further comprising a current source coupled to the second output, the current source being controllable by the pulse-width modulated clock signal.

8. The voltage conversion circuit according to claim 7, wherein the current source is configured to provide a first current for the first state of the pulse-width modulated clock signal and to provide a second current for the second state of the pulse-width modulated clock signal, the first and the second current being distinct from zero.

9. The voltage conversion circuit according to claim 1, wherein the forward branch is configured to generate the output voltage further depending on a clocked activation signal and on the state of the pulse-width modulated clock signal.

10. A voltage conversion method, comprising the steps of:
providing an electric load connected between a first output and a second output;
providing a charge store with a first end directly connected to the second output;
generating an output voltage at the first output depending on a control signal;
generating an output signal between the first and the second output in response to a pulse-width modulated clock signal;
comparing a first potential corresponding to a voltage at the second output with a reference voltage during a first sensing period which corresponds to at least a part of a period of a first state of the pulse-width modulated clock signal;
switchably coupling, via a first switch, the second output to a comparison input for comparing the first potential corresponding to the voltage at the second output;
comparing a second potential derived from the voltage at the second output by means of the charge store with the reference voltage during a second sensing period which corresponds to a part of a period of a second state of the pulse-width modulated clock signal;
switchably coupling, via a second switch, a second end of the first charge store to the comparison input for comparing the second potential derived from the voltage at the second output by means of the charge store; and
generating the control signal depending on the comparison results,
wherein the charge store is pre-charged during an intermediate period between the first and the second sensing period.

11. The voltage conversion method according to claim 10, wherein the charge store is pre-charged during the first sensing period depending on the first potential.

12. The voltage conversion method according to claim 10, wherein generating the output signal comprises providing a first current for the first state of the pulse-width modulated clock signal and providing a second current for the second state of the pulse-width modulated clock signal, the first and the second current being provided at the second output and being distinct from zero.

13. The voltage conversion method according to claim 10, wherein the output voltage is generated further depending on a clocked activation signal and on the state of the pulse-width modulated clock signal.

14. An illumination arrangement having a voltage conversion circuit according to claim 1, wherein the electric load comprises at least one light emitting element.

15. The voltage conversion method according to claim 10, further comprising:
pre-charging the first charge store, by means of a buffer stage with an output coupled to the first charge store, to a voltage corresponding to a voltage change between the first state and the second state of the pulse-width modulated clock signal.

\* \* \* \* \*